March 13, 1934.  E. H. FAHRNEY  1,951,139
SYNCHRONOUS SHIFTABLE BEVEL GEARING
Filed March 30, 1932  2 Sheets-Sheet 1

INVENTOR.
EMERY H. FAHRNEY
BY GR Gehrandt
ATTORNEY

March 13, 1934.  E. H. FAHRNEY  1,951,139
SYNCHRONOUS SHIFTABLE BEVEL GEARING
Filed March 30, 1932  2 Sheets-Sheet 2

INVENTOR.
EMERY H. FAHRNEY
BY
ATTORNEY

Patented Mar. 13, 1934

1,951,139

UNITED STATES PATENT OFFICE 1,951,139

SYNCHRONOUS SHIFTABLE BEVEL GEARING

Emery H. Fahrney, Chicago, Ill.

Application March 30, 1932, Serial No. 601,901

4 Claims. (Cl. 74—58)

This invention relates in general to shiftable bevel gear mechanism, and one of the objects of the same is to provide an improved construction and arrangement of the bevel gearing, the elements of which are shiftable into and out of mesh, and improved means for placing the elements which are to be brought into mesh into proper relative or meshing position before being actually brought into mesh, thereby avoiding the danger and damage to the gear teeth, and at the same time provide improved means whereby the gears may, with less power than ordinarily required, be readily meshed, regardless of the speed of rotation of either of the gears.

A further object is to provide an improved pilot gear operatively connected with one of the gears and operable upon the other gear in advance of the gear to which the pilot gear is connected, to cause the pitch line of the gears which are to be brought into mesh, to assume a meshing position with relation to each other before the gears are actually meshed.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in vertical section, partly in elevation, and with parts broken away, of a gear mechanism of this character constructed in accordance with the principles of this invention and showing the parts in a neutral position.

Figure 1:
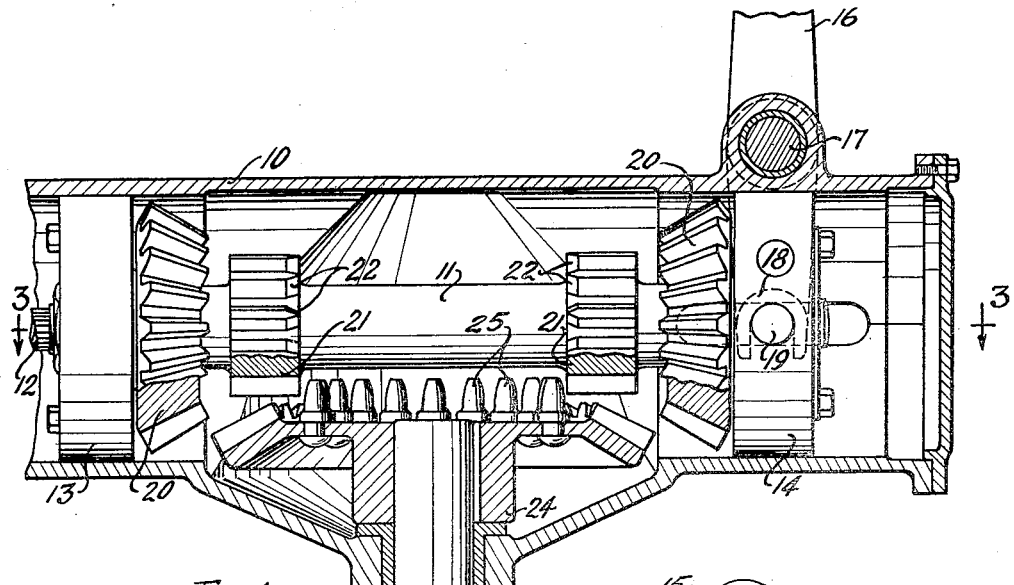
Figure 2:
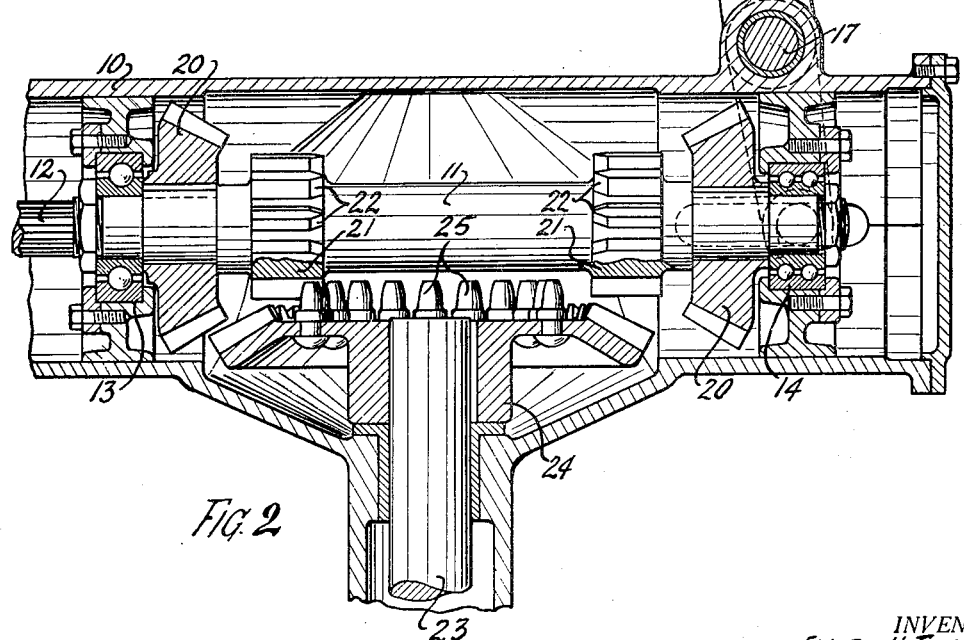
Figure 2 is a view similar to Figure 1, showing the gears as partly shifted one with respect to the other and with the pilot gear operating upon one of the gears to place the same in a meshing position with respect to the gear which is to be meshed therewith.
Figure 3:
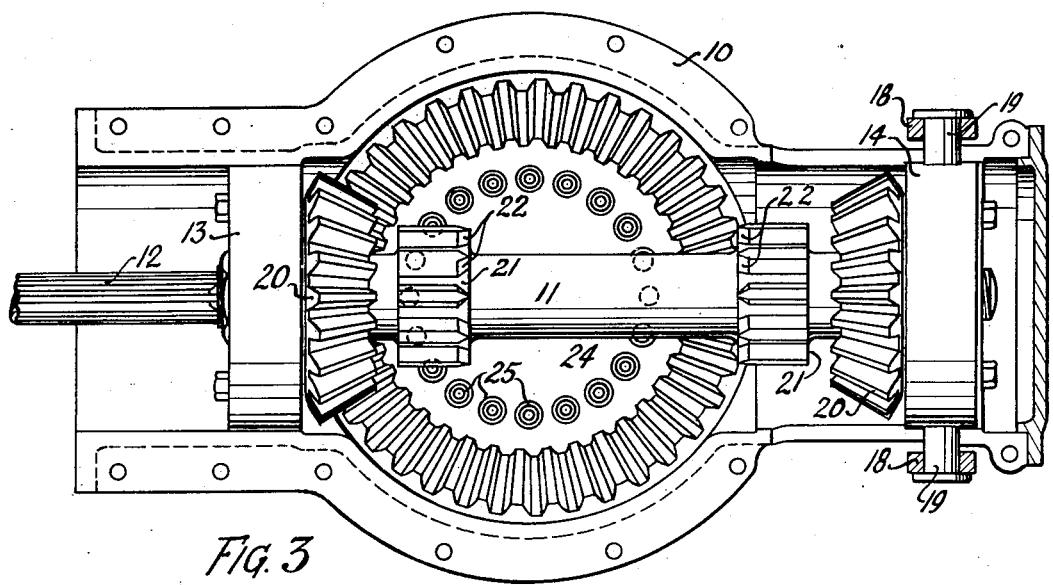
Figure 3 is a view taken on line 3—3, Figure 1, showing the gears in actual meshing relation.

Referring more particularly to the drawings, and in the form of the invention shown in Figures 1 to 3, the numeral 10 designates a suitable casing or housing for the gear, and 11 designates a driving shaft which has a suitable floating connection 12 with the source of power. This shaft 11 is journaled in bearings 13—14 which fit and are slidable in the casing 10. The bearing 13 is of the roller type and is designed to resist radial thrust of the driving shaft, and the bearing 14 is also of the roller type and is constructed so as to resist radial thrust as well as axial load of the shaft 11. The shaft 11 and the bearings 13 and 14 are adapted to be moved in directions lengthwise of the axis of the shaft 11 in any desired or suitable manner preferably by means of an operating lever 15 connected to an arm 16, which latter is pivotally mounted intermediate its ends as at 17 and is formed with a yoke shaped portion to provide arms 18 which receive trunnions 19 carried by the bearing 14 so that by actuating the arm or lever 16, the bearings as well as the shaft 11 may be moved lengthwise of the casing 10.

Secured to the shaft 11 to rotate therewith are bevel gears 20 and intermediate these gears and secured also to the shaft 11 for rotation therewith are pilot gears 21, the teeth of which are in alinement with the teeth of the respective bevel gears 20 and these pilot gears 21 are separated from each other for any desired distance according to the diameter of the gear with which the bevel gears 20 are to be brought into mesh. The extremity of the teeth of the pilot gears remote from the adjacent bevel gears 20 are tapered as at 22, for a purpose to be hereinafter set forth.

The numeral 23 designates a driven shaft rotatable on an axis transverse to the axis of the shaft 11 and connected to the shaft 23 is a bevel gear 24 with which the bevel gears 20 are to be brought into mesh. Secured to the bevel gear 24 and projecting upwardly therefrom are pins, teeth or projections 25 which are preferably tapered or conical and these pins or projections may be secured to the gear 24 in any desired or suitable manner and are of a diameter slightly less than the space between the teeth of the pilot gears 21 beyond the tapered portion 22 of the teeth. These pins or projections 25 project for any desired distance beyond the toothed face of the bevel gear 24 and are preferably arranged at substantially right angles to the axis of the gear 20, but terminate short of the periphery of the shaft 11 and are so arranged that when the shaft 11 is shifted longitudinally, they will enter the space between the teeth of the respective pilot gears 21, according to the direction in which the shaft 11 is shifted, formed by the beveled portions of the gear teeth.

It will be manifest therefore and assuming the parts to be in the position shown in Figure 1, that when the arm or lever 16 is rocked about its pivot 17 to move the shaft 11 in one direction one of the pilot gears 21 will be moved toward the axis of the shaft 23 while the other is moved away from the axis. As the pilot gear approaches the pins or projections 25, the space between the tapered portions of the teeth of the pilot gear will receive one of the pins or projections 25 and as the shaft 11 is moved in the same direction, and the pilot gear 21 advanced, the pin or projection 25 will be caused to enter the space between the teeth of the pilot gear and to the rear of the tapered portions of such teeth, with the result that as the pins or projections enter the space between the teeth of the pilot gear and behind the tapered portion of such teeth, the gear 24 will be axially rotated a sufficient distance to bring the gear 24 into a proper meshing position or relation with respect to the gear 20 by causing the pitch circle of the gear 24 to be in a position to mesh with the pitch circle of the gear 20. The bevel gears 24—20 will be thus relatively positioned before the gears 20 and 24 have been brought into actual mesh, with the result that a further shifting or movement of the shaft 11 with the gears 21 and 20, in the same direction, will cause the gear 20 to be moved into mesh with the gear 24. This will prevent the teeth of the gear 20 from striking the crown or edge of the teeth of the gear 24, with the result that all damage and injury to the gear teeth will be avoided.

Obviously when it is desired to reverse the direction of rotation of the driven shaft 23, the shaft 11 will be shifted longitudinally in the opposite direction to cause the teeth of the other pilot gear to move into engagement with the pins or projections 25, and likewise position the teeth of the gear 24 with respect to the teeth of the other bevel gear 20 so that they may be moved into meshing position, while the other gear 20 is moved out of mesh with the gear 24.

By positioning the pilot gears 21 with respect to the gear 24 as shown in Figure 1, the parts will be in a neutral position and either one or the other of the pilot gears 21 may be caused to be rendered active with respect to the gear 24, according to the direction of movement of the arm or lever 16.

In this form of the invention the pilot gears 21 are formed integral with the shaft 11 and are separate and spaced from the gears 20.

With this invention, it will be manifest that the gears will be properly positioned for meshing relation and all danger of the crown or one edge of the gear teeth of one of the gears contacting with the edge of the other gear to which it is to be brought into mesh will be avoided, and the proper positioning of the gears with relation to each other will be assured. This will result in a quiet shifting of the gears and will necessitate a minimum amount of power to effect a meshing of the gears and which power will be considerably less than is necessary to move the ordinary bevel gears into mesh.

Furthermore, it is possible to quickly shift the gears into mesh regardless of the speed of rotation of either of the gears without the danger of injuring or causing any damage to the teeth of the co-operating gears.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A gear transmission embodying a bevel gear, a bevel pinion movable into and out of meshing relation with the gear, means for effecting such movements, spaced radial projections encompassing the axis of said pinion, and projections carried by said bevel gear at substantially right angles to the axis of said pinion, said projections adapted to enter the spaces between the first recited projections for effecting a slight relative rotation of the bevel gear with respect to said pinion for placing the pinion and gear in proper meshing relation before they are brought into active meshing engagement.

2. A gear transmission embodying a bevel gear, a bevel pinion movable into and out of meshing relation with the gear, means for effecting such movements, spaced radial projections encompassing the axis of said pinion, and projections carried by said bevel gear at substantially right angles to the axis of said pinion, said projections adapted to enter the spaces between the first recited projections for effecting a slight relative rotation of the bevel gear with respect to said pinion for placing the pinion and gear in proper meshing relation before they are brought into active meshing engagement, the proximate face of adjacent radial projections at the entrance of the spaces therebetween, diverging from points spaced from, to the extremities of said projections at said entrance.

3. A gear transmission embodying a bevel gear, a bevel pinion movable into and out of mesh with the gear, means for effecting such movements, a pilot gear connected with the pinion and bodily movable therewith, and projections carried by the said bevel gear, said projections adapted to enter the spaces between the teeth of said pinion as the latter is shifted, to effect a slight rotary movement of the said gear in advance of meshing engagement of the said pinion with the said gear.

4. A gear transmission embodying a bevel gear, a bevel pinion movable into and out of mesh with the gear, means for effecting such movements, a pilot gear connected with the pinion and bodily movable therewith, and projections carried by the said bevel gear, said projections adapted to enter the spaces between the teeth of said pinion as the latter is shifted, to effect a slight rotary movement of the said gear in advance of meshing engagement of the said pinion with the said gear, the lateral faces of the teeth of the pilot gear being tapered at the entrance to the space between the teeth for guiding said projections between the teeth of the pilot gear.

EMERY H. FAHRNEY.